United States Patent [19]

Suzuki

[11] Patent Number: 5,778,099
[45] Date of Patent: Jul. 7, 1998

[54] PICTURE BLOCK MOTION DETECTING APPARATUS

[75] Inventor: Mitsuyoshi Suzuki, Tokyo, Japan

[73] Assignee: Mitsubishi Denki Kabushiki Kaisha, Tokyo, Japan

[21] Appl. No.: 590,941

[22] Filed: Jan. 24, 1996

[30] Foreign Application Priority Data

Aug. 18, 1995 [JP] Japan ................................. 7-210568

[51] Int. Cl.⁶ ................................................ G06K 9/36
[52] U.S. Cl. .................... 382/239; 348/409; 348/415; 348/416
[58] Field of Search ........................... 348/431, 451, 348/452, 409, 413, 415, 416; 382/239

[56] References Cited

U.S. PATENT DOCUMENTS

| | | | |
|---|---|---|---|
| 4,992,869 | 2/1991 | Samad et al. | 348/451 |
| 5,025,495 | 6/1991 | Avis | 348/451 |
| 5,103,295 | 4/1992 | Uwabata | 348/451 |
| 5,208,667 | 5/1993 | Saunders | 348/451 |
| 5,400,087 | 3/1995 | Uramoto et al. | 348/699 |

*Primary Examiner*—Thomas L. Stoll
*Attorney, Agent, or Firm*—Leydig, Voit & Mayer, Ltd.

[57] ABSTRACT

The invention selects a plurality of search ranges so that picture block motion detection can be controlled by feed forward sequence. A picture block motion detecting apparatus obtains an activity of blocks to be detected in advance, and then controls detection range of blocks to be detected next according to said activity. In the picture block motion detecting apparatus, motion vector is detected while picture block motion detection is not carried out, and backward inter-frame picture block motion detecting circuit in idle state operates when forward inter-frame picture block motion detection is operating, which provides an enlarged search range rather than that of bidirectional inter-frame picture block motion detection.

10 Claims, 15 Drawing Sheets

4096 POINTS SEARCH

1024 POINTS SEARCH

2048 POINTS SEARCH

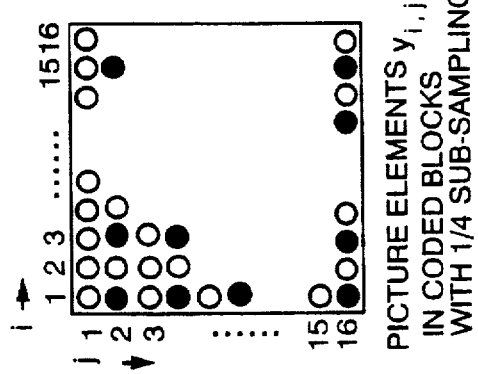
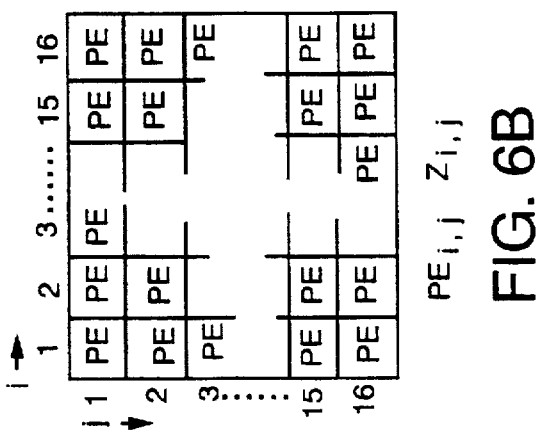
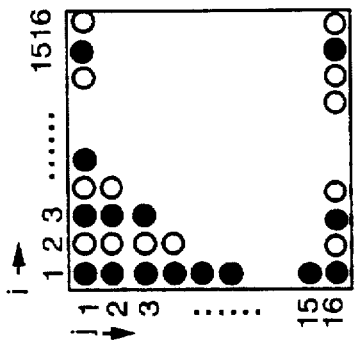
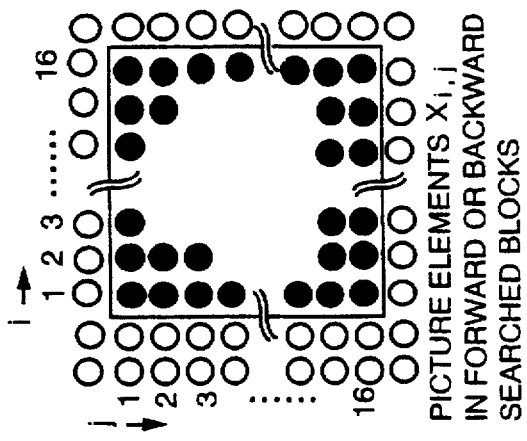
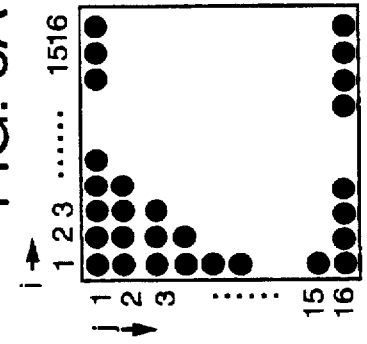

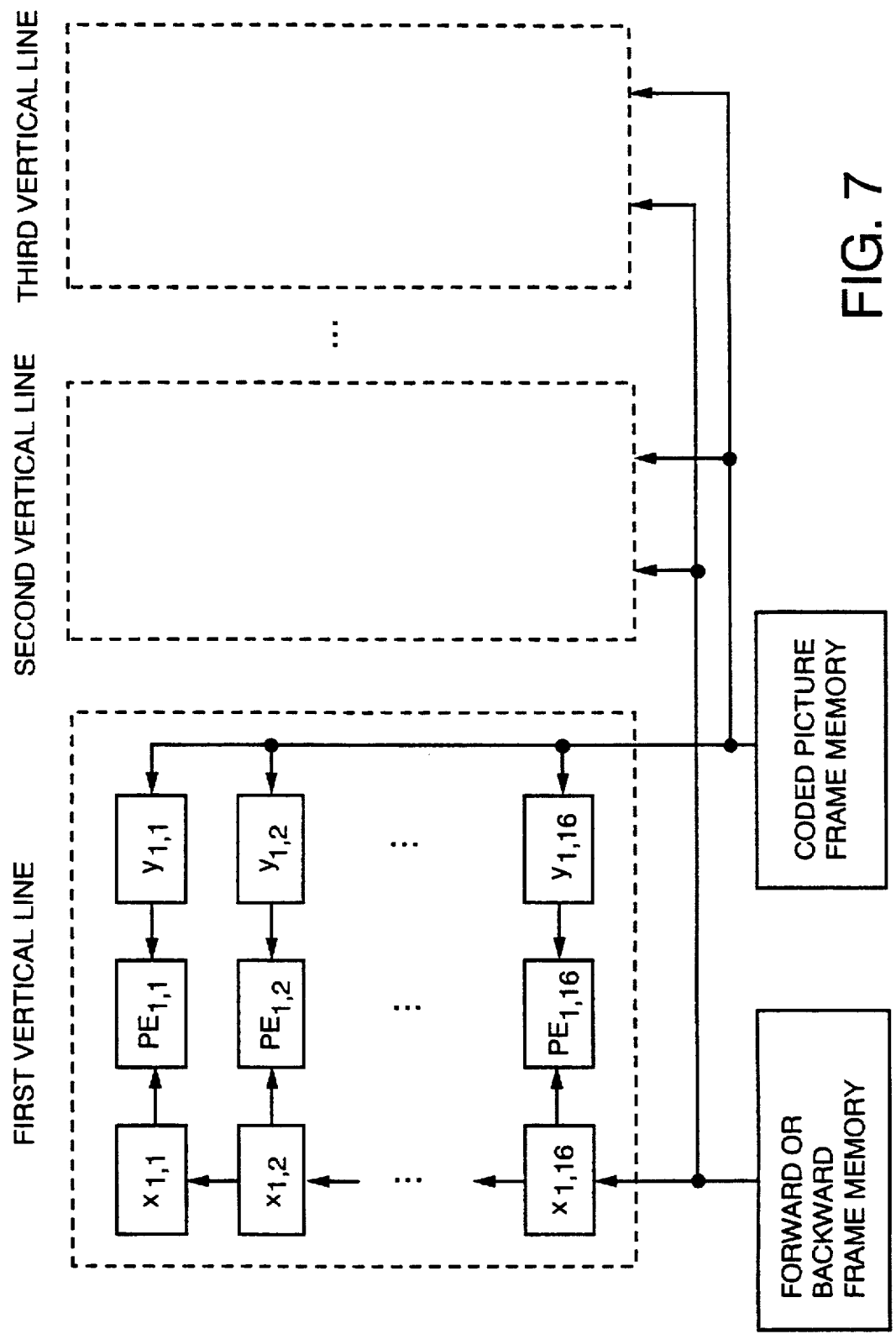

PICTURE BLOCK MOTION DETECTING APPARATUS

BACKGROUND OF THE INVENTION

1. Field of the Invention

The present invention relates to detection of picture block motion in motion picture compression. In particular, the present invention relates to a picture block motion detecting apparatus for obtaining an activity for picture block motion in advance and then controlling searching range of picture block to be detected next based on the activity.

2. Description of the Prior Art

In general, when detecting picture block motion in real-time picture compression such as MPEG, the larger the detection range is the higher the backward compression coding efficiency becomes. Since detection of picture block motion requires a considerable amount of computation, search range is generally insufficient. Therefore, the computing is carried out in a predetermined circuit within its maximum search range allowed by its computing capacity. In case of hardware base, the search range is fixed, on the other hand, in case of software base, the search range is variable in order to use the maximum of remaining computing time for other coding.

FIG. 13 is a block diagram of a coding apparatus including conventional picture block motion detecting apparatus. In FIG. 13, the coding apparatus comprises an original motion picture input 1, an input buffer memory 2, a picture block motion detecting circuit 3, a predicted picture memory 4, a predicted picture 5, a picture block motion detecting circuit 6, a motion vector 7, a coded picture 8, a predicted picture 9, a differential coding unit 10, coded data 11, a transmitting buffer memory 12, transmitted data 13, and a local decoded picture 14.

Operation of the conventional picture block motion detecting apparatus is explained below. Respective frames of the original picture input 1 from a camera to be decoded are stored in the input buffer memory 2 and kept until picture block motion detection and differential coding are carried out. With regard to the frames to be coded, the picture block motion detecting circuit 6 detects at first picture block motion and computes motion vector 7, using the picture block motion detecting coded picture 3 from the input buffer memory 2 and the predicted picture 5 from the predicted picture memory 4. Next, differential coding unit 10 carries out differential coding, based on the coded picture 8 from the input buffer memory 2, the motion vector 7, and the predicted picture 9 which is motion-compensated by the predicted picture memory 4. The coded data 11 is transferred through the transmitting buffer memory 12 as transmitted data 13, and the local decoded picture 14 is stored in the predicted picture memory 4 for backward prediction.

FIG. 14 shows a method of predictive coding according to MPEG. B picture is predicted bidirectionally, using forward I or P picture and backward I or P picture. Therefore, in case of B picture, it is necessary to compute predictive coding for the reference block to be coded, using two blocks, one from preceding frame and the other from succeeding frame. As a result, both a forward picture block motion detecting circuit and a backward picture block motion detecting circuit are required. On the other hand, in case of P picture, since only a forward prediction from forward I or P picture is carried out a backward picture block motion detecting circuit is unnecessary.

FIG. 15 shows a conventional picture block motion detecting circuit for both forward and backward inter-frame differential coding in MPEG and a surrounding circuit. The conventional block motion detecting circuit comprises forward and backward predicted picture memories 4a, 4b, and forward and backward picture block motion detecting circuits 6a, 6b. The picture block motion detecting circuits 6a, 6b detect motion vectors 7a, 7b respectively, using respective picture block motion detecting coded pictures 3a, 3b from input buffer memory 2 and respective predicted pictures 5a, 5b from predicted picture memories 4a, 4b. In case of coding B picture, both a forward motion detecting circuit 6a and a backward motion detecting circuit 6b operate. Then, selecting circuit 15 selects a forward motion vector 7a, a backward motion vector 7b, or averaged signals of both forward motion vector 7a and a backward motion vector 7b, and carries out prediction. In case of coding P picture, only the forward picture block motion detecting circuit 6a is operating, while the backward motion detecting circuit 6b is in an idle state.

As mentioned above, the conventional picture block motion detecting circuit detects picture block motion of only fixed range, not being adaptable to each picture condition, which results in disadvantages of detecting inappropriate motion vectors for blocks requiring larger search range, and low picture quality. Also, in case of coding P picture, the backward motion detecting circuit is in idle condition, which means waste of hardware.

It is an object of the present invention to provide a picture block motion detecting apparatus for selecting motion search range, sub-sampling density, and half picture element accuracy detection, and to obtain activity of block motion to be detected next, and then for controlling detection method to be detected next according to the activity.

Further, in the picture block motion detecting apparatus, a motion vector is detected while picture block motion detection is not carried out, and backward inter-frame picture block motion detecting circuit in an idle state operates when forward inter-frame picture block motion detection is operating, which provides an enlarged search range compared to that of bidirectional inter-frame picture block motion detection.

It is another object of the present invention to provide a picture block motion detecting apparatus, where search range can be selected from a plurality of search ranges so that picture block motion detection can be controlled by feed forward sequence, although the computing performance of hardware base in the picture block motion detecting circuit is fixed.

It is a further object of the present invention to provide a picture block motion detecting apparatus, where picture block motion detection range is enlarged only when forward picture block motion detection is carried out, and also picture block motion detection is carried out during inner frame coding, in MPEG system in which forward and backward bidirectional inter-frame predictive differential coding are available.

SUMMARY OF THE INVENTION

According to one aspect of the invention, a picture block motion detecting apparatus comprises means for obtaining an activity of blocks to be detected in advance, and means for controlling detection range of blocks to be detected next according to said activity.

According to another aspect of the invention, a picture block motion detecting apparatus comprises means for sub-sampling picture block motion detecting coded picture by ½, ¼ sub-sampling rates and so on, so that search range of motion can be enlarged in comparison with that of when sub-sampling is not carried out using the same computing unit.

According to further aspect of the invention, a picture block motion detecting apparatus comprising an input buffer memory, a predicted picture memory, and a picture block motion detecting circuit comprises means for calculating activity according to coded picture from said input buffer memory and predicted picture from said predicted picture memory, and means for controlling detection range of blocks according to said activity.

According to further aspect of the invention, a picture block motion detecting apparatus comprises means for searching blocks using backward inter-frame picture block motion detecting unit in idle state while forward inter-frame picture block motion detection is in progress in order to enlarge detection range rather than when bidirectional inter-frame picture block motion detection is in progress.

BRIEF DESCRIPTION OF THE DRAWINGS

FIG. 6 shows sub-sampling of detected block of the present invention.

FIG. 7 shows a block diagram showing calculation process of the present invention.

DETAILED DESCRIPTION OF THE PREFERRED EMBODIMENTS

Embodiment 1

Figure 1:
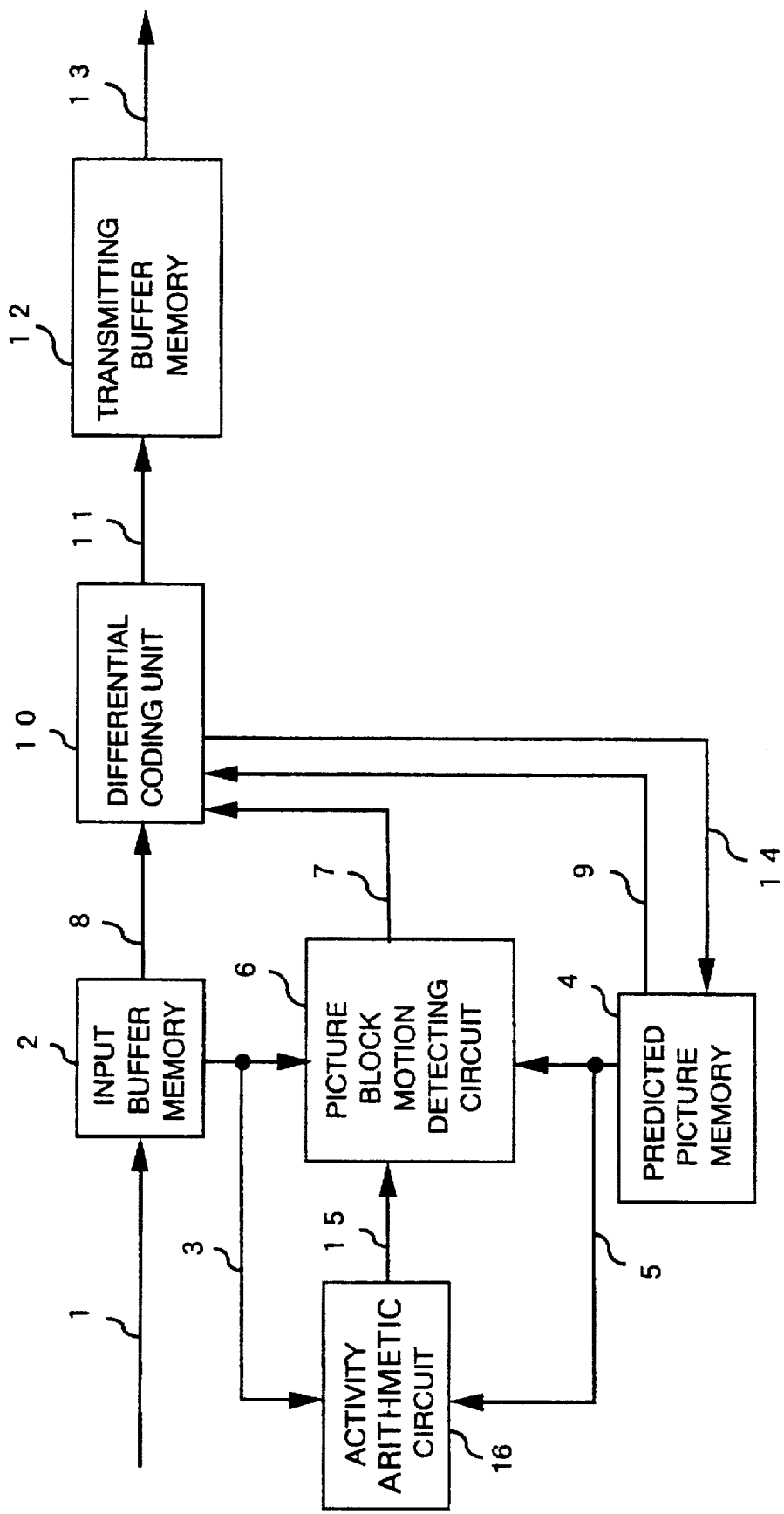
FIG. 1 shows a construction of a picture block motion detecting apparatus of an embodiment of the present invention.
Figure 13:
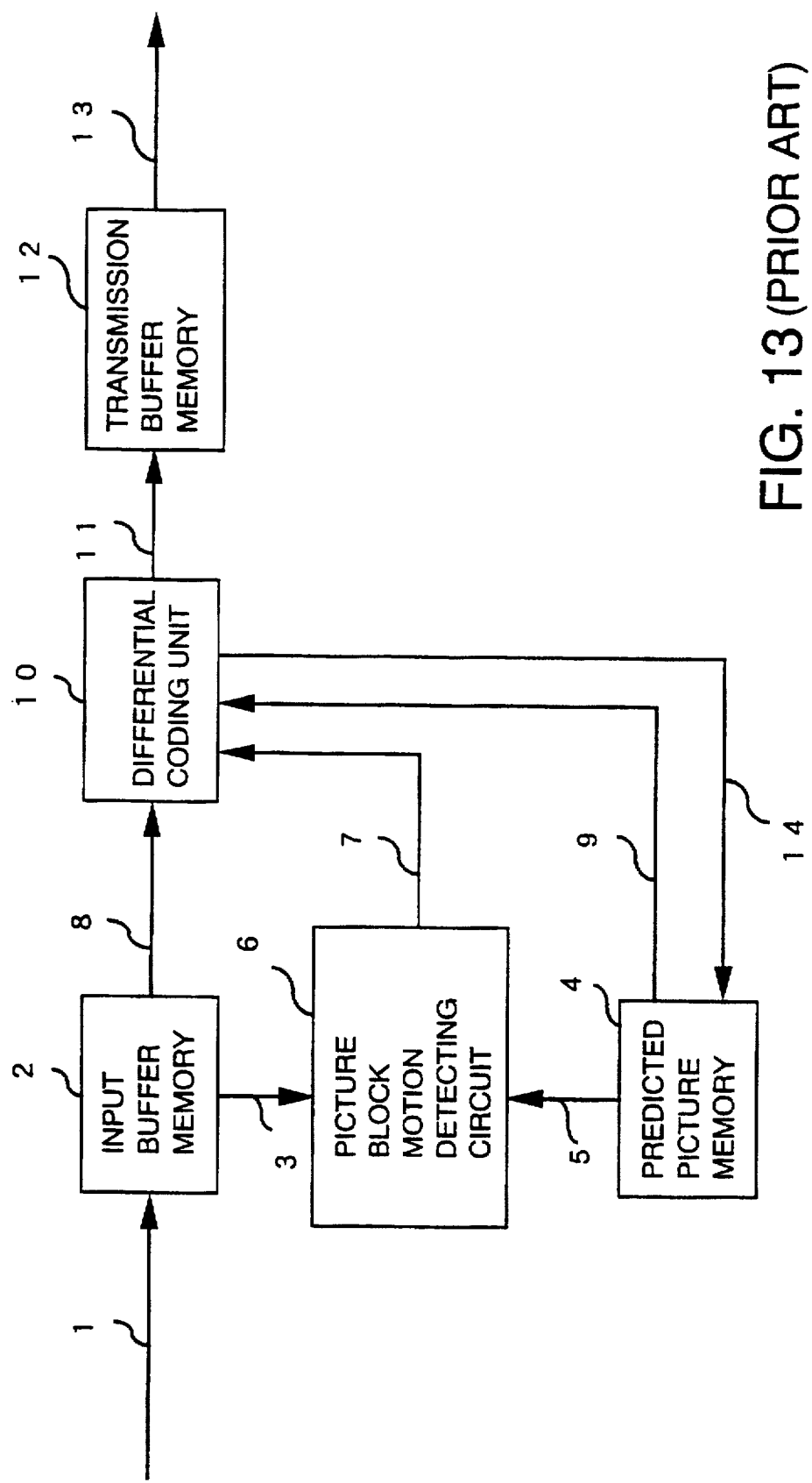
FIG. 13 shows a conventional coding apparatus including a picture block motion detecting apparatus.

FIG. 1 shows a construction of a picture block motion detecting apparatus of an embodiment of the present invention. In FIG. 1, the picture block motion detecting apparatus comprises an activity arithmetic circuit 16. The activity arithmetic circuit 16 outputs a picture block motion detection controlling command 15. Elements commonly numbered in FIG. 1 and FIG. 13 are not provided with a detailed explanation here. These elements are described above in connection with FIG. 13.

An operation of FIG. 1 is explained below. Since the same elements operate in the same way as in the conventional art which is already explained, further explanation is omitted. Only the elements unique to the present invention are explained.

Prior to detecting the motion of the picture block, activity computing circuit 16 computes activity for K blocks from (N+1)-th block to (N+K)-th block in which motions are to be detected, using picture block motion detecting coded picture 3 from input buffer memory 2 and predicted picture 5 from predicted picture memory 4. This activity can be expressed, for instance, by the sum of the differential absolute values of respective picture elements in blocks when a motion vector of picture block motion detecting coded picture 3 and predicted picture 5 is 0, and the distribution of respective picture elements in blocks of picture block motion detecting coded picture 3. Activity computing circuit 16 determines the range of search, and the resultant picture block motion detection controlling command 15 controls the range of search at the picture block motion detecting circuit 6.

Figure 2C:
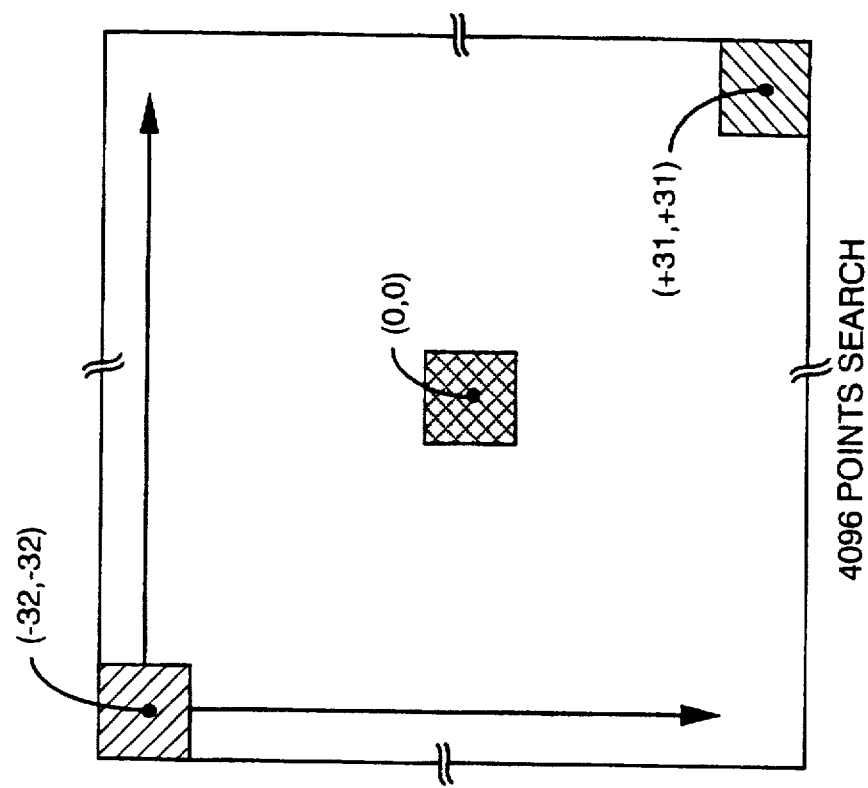
FIG. 2 shows a motion search range of the present invention.
Figure 2A:
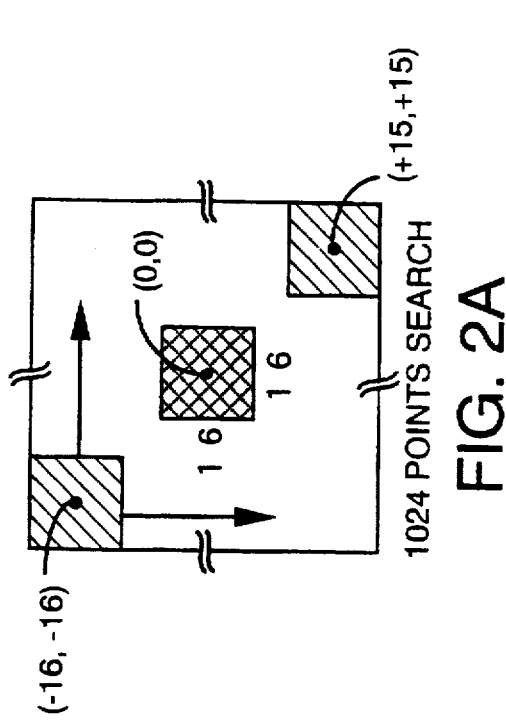

FIG. 2 shows a method for changing motion search ranges of the present invention. In this case, assuming the size of A block, for example, is 16×16, then a vector having A minimum evaluation value such as the sum of the differential absolute value of 256 picture elements is calculated. FIG. 2A shows a range of search covered by predicted picture 5 in which horizontal range is (−16~+15), and vertical range is (−16~+15). The activity computing circuit 16 shifts the vectors sequentially from (−16, −16) to (+15, +15) toward vertical direction and horizontal direction to obtain evaluation values for respective vectors, and determines the smallest vector in all evaluation values of 256 as a motion vector. In this case, amount necessary for computing the sum of the differential absolute values is expressed as 256 (the number of picture elements)×256 (the number of vectors)=65536/block.

Figure 2B:
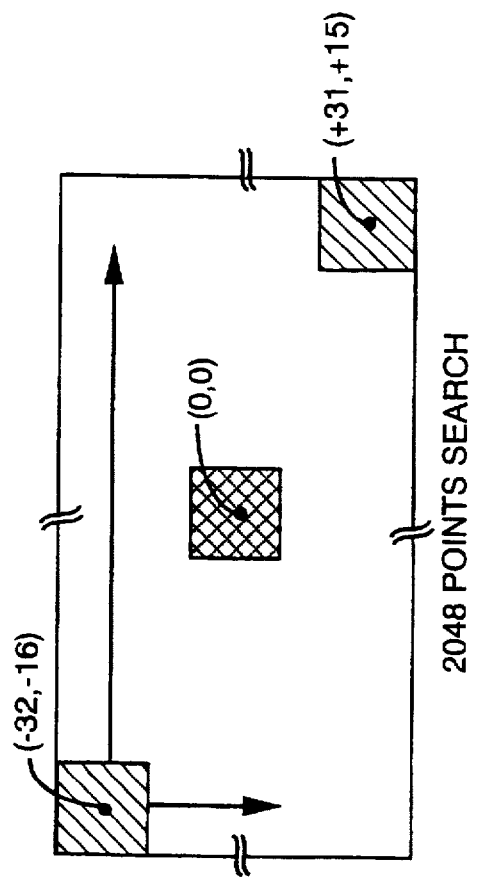

In the same way, FIG. 2B shows a range of search covered by predicted picture 5 in which horizontal range is (−32~+31), and vertical range is (−16~+15). In this case, amount necessary for computing is 131072/block.

In the same way, FIG. 2C shows a range of search covered by predicted picture 5 in which horizontal range is (−32~+31), and vertical range is (−32~+31). In this case, amount necessary for computing is 262144/block. In FIGS. 2A~2C, amount necessary for computing is proportional to the area of the search range. The present invention is characterized by using a conventional picture block motion detecting circuit not only for computing the search range of FIG. 2B, but also detecting picture block motion in the search range of FIGS. 2A or 2C.

Figure 3:
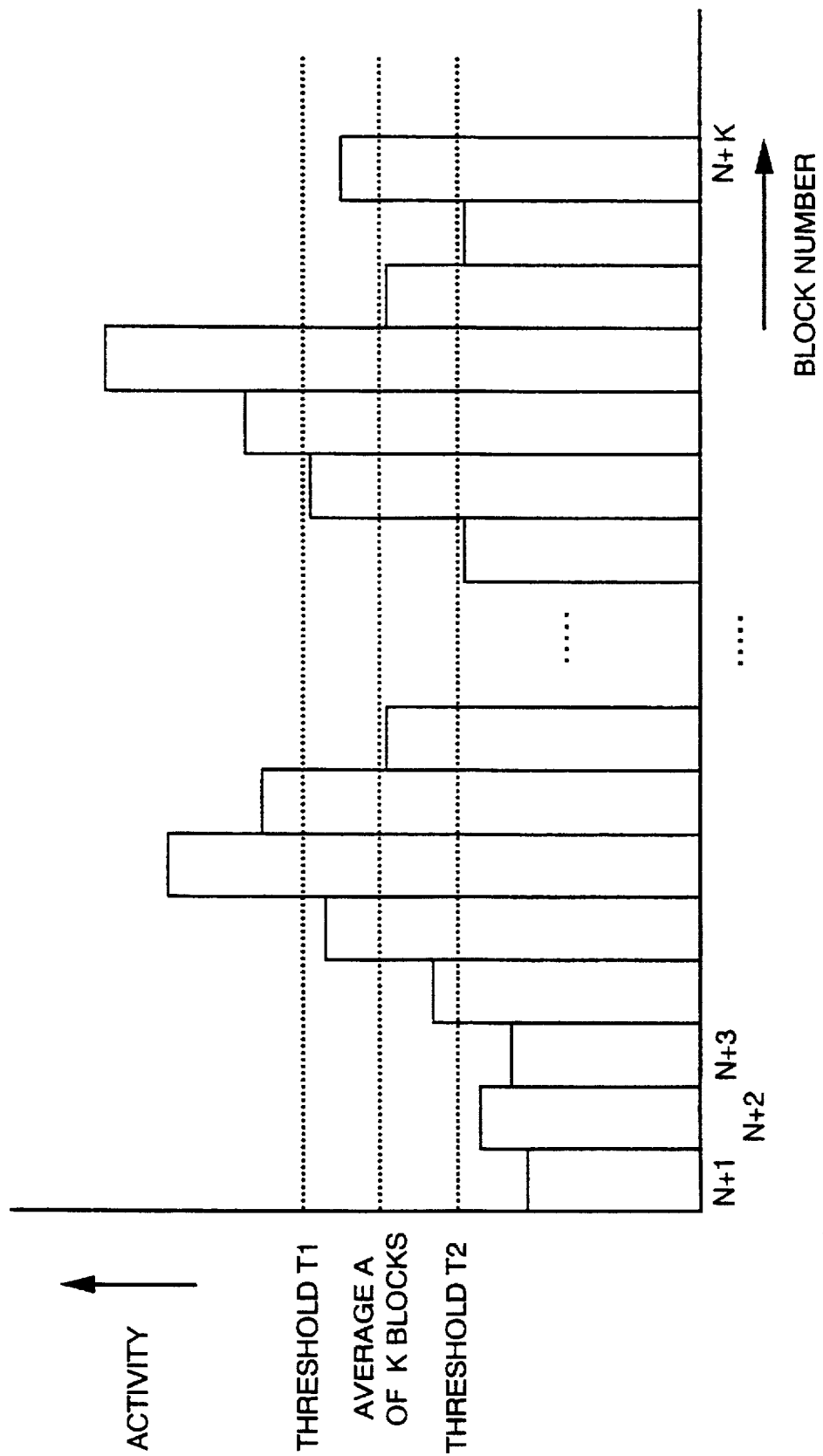
FIG. 3 shows activity of respective blocks of the present invention.
Figure 4:
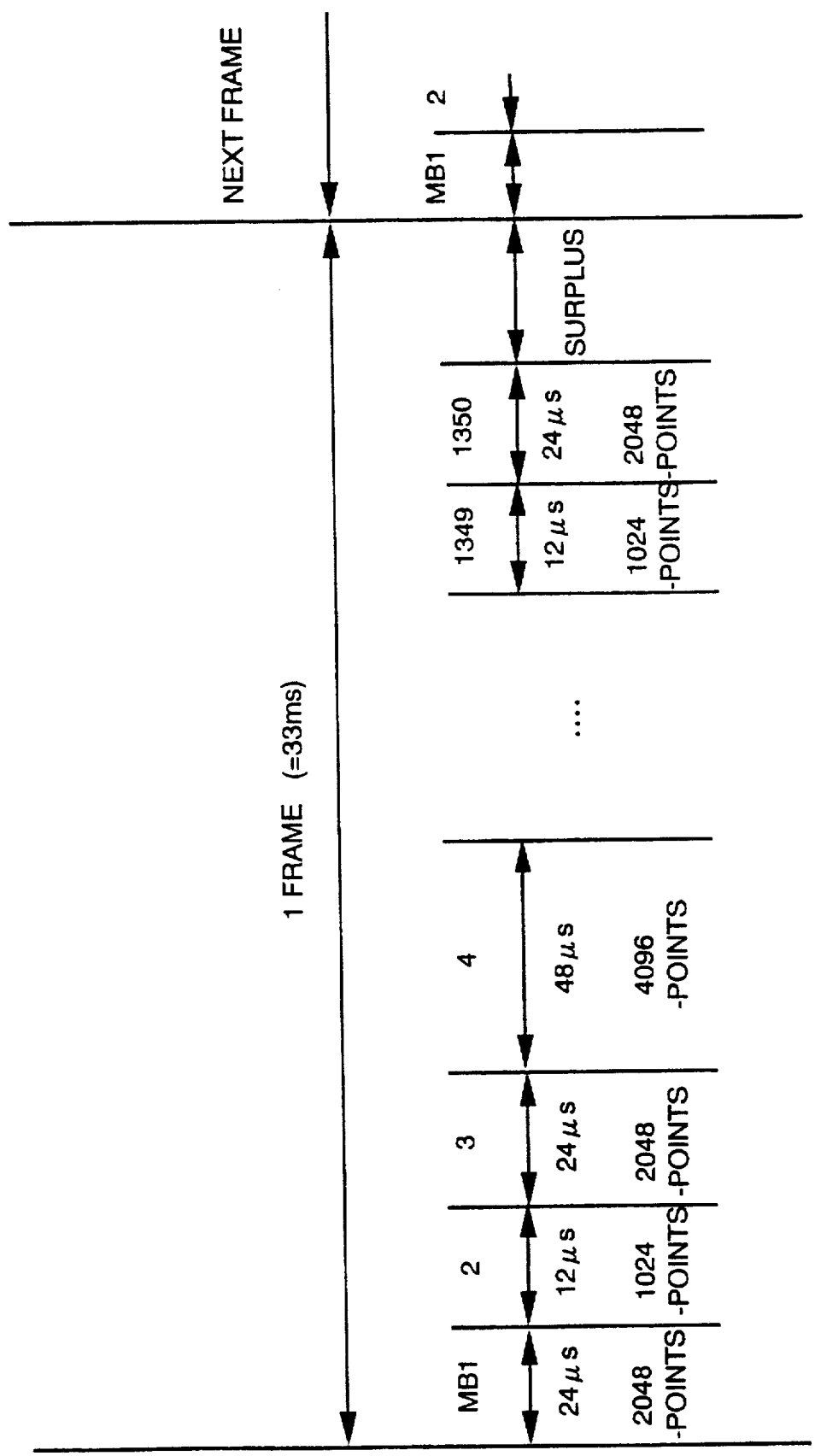
FIG. 4 is a timing chart of motion detection controlled by activity.

FIG. 3 shows activity (sum of the differential absolute value of respective picture elements in blocks when motion vectors of picture block motion detecting coded picture 3 and predicted picture 5 are 0) of K blocks from (N+1)-th block to (N+K)-th block of the present invention. Threshold T1 is set above average A which has an average value of K blocks, and threshold T2 is set below the average A. Where, threshold value T1 of (N+1)-th block is obtained by adding a predetermined constant α to the average of activity A of K blocks from preceding (N+1)-th block to (N+K)-th block or threshold value T2 of (N+1)-th block is obtained by subtracting a predetermined constant α from the average A such as T1=A+α, T2=A−α.

In this way, the most of sums of the differential absolute value of respective elements in blocks is between thresholds T1 and T2 in average, and the total number of the picture elements is 2048 points (24 μs). If threshold is determined so that the blocks above the threshold T1 (4096 points, 48 μs) and the blocks below T2 (1024 points, 12 μs) are averaged to be 24 μs/MB (micro block), the detecting the motion of all MB can be completed within 33 mS.

If (N+1)-th block where the picture block motion is to be detected is less than threshold T2, that is, in case it is assumed that appropriate motion vectors can be detected within small search range, 1024 points search can be carried out as shown in FIG. 2A. If (N+1)-th block where the picture block motion is to be detected is larger than threshold T1, 4096 points search can be carried out as shown in FIG. 2C. If (N+1)-th block where the picture block motion is to be detected is between T1 and T2, 2048 points search can be carried out as shown in FIG. 2B.

On the other hand, the framing time for one frame is the same as that of one frame sent from camera, which is 33 ms in case of NTSC. In case of MPEG2, since one frame is divided into 1350 MB micro blocks having 45 (720 picture elements toward horizontal) MB (micro block)×30 MB (480 lines toward vertical)=1350 MB, computing time per 1 MB becomes 33 mS/1350 MB=24 μs/MB. Therefore, using motion detecting circuit which can detect 2048 points per 24 μs, it takes 12 μs for searching 1024 points, and 48 μs for searching 4096 points. Using activity control, it is possible to detect the motion of all of 1350 MB within one frame coding time, which gives more detecting time to achieve a other MB which is necessary to wider search range.

Figure 5:
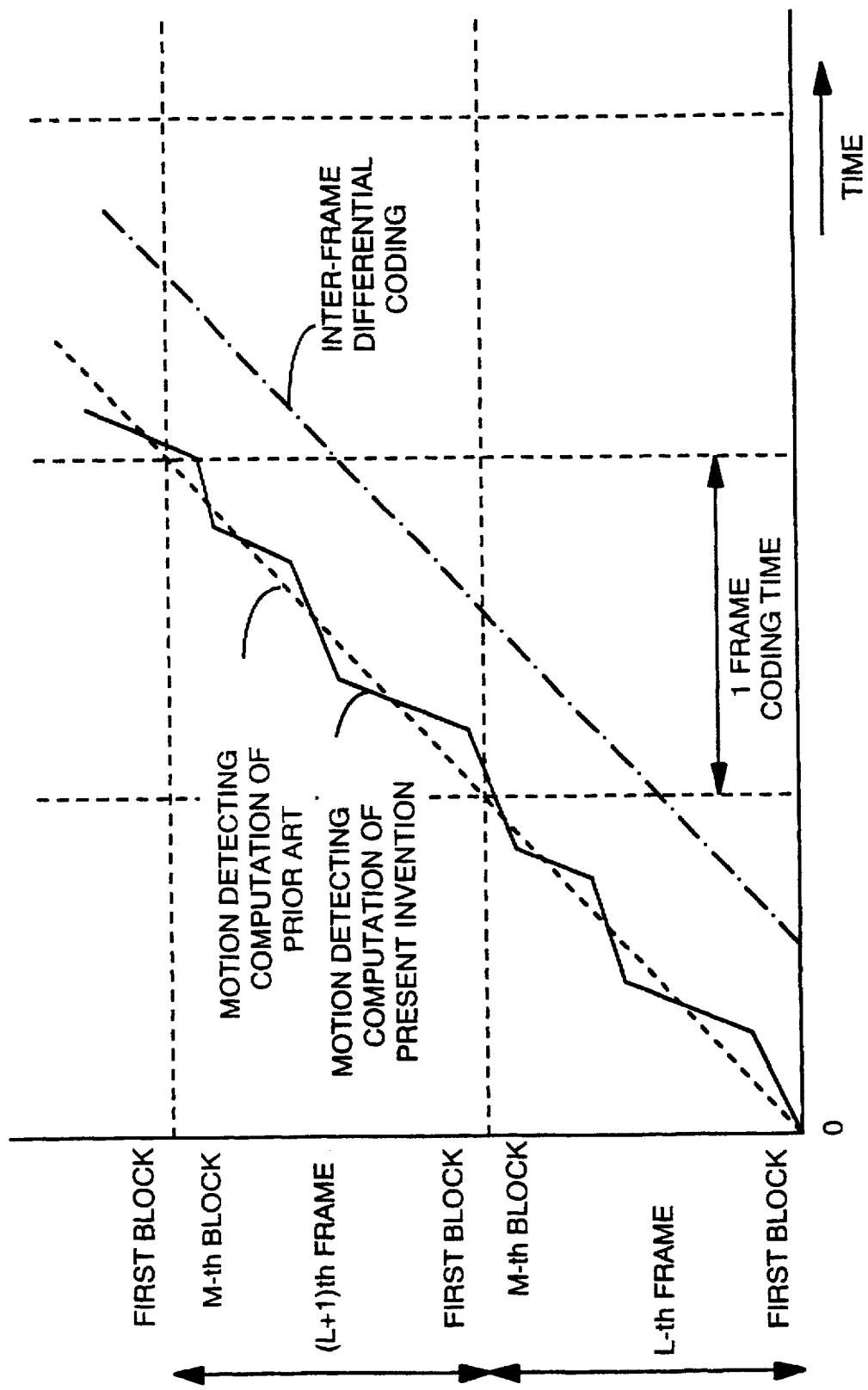
FIG. 5 shows a timing chart of picture block motion detection of the present invention.

FIG. 5 shows a timing chart of picture block motion detection of the present invention. In FIG. 5, horizontal axis indicates time, and vertical axis indicates frame number and block number. In this case, the number of blocks in one frame is M, and motion detection of the first block of L-th frame starts at time 0. In the conventional motion detection computing system, the picture block motion detection of M-th block in L-th frame is just completed at the end of one frame coding time as illustrated by the dotted inclined line. In the prior art, as mentioned above, since the picture block motion detection does not deviate toward values larger than the threshold T1 (48 μs) or toward values smaller than the threshold T2 (12 μs) but occurs in the average frequencies by using motion average, it is possible to complete the motion detection of all MB within just one frame time.

On the other hand, in the present invention, computing time of picture block motion detection repeats operations which become faster or slower in comparison with that of the conventional method, as shown in solid line. On the other hand, the inter-frame differential coding is processed shortly behind the timing mentioned above, as shown by a chain line. In FIG. 1, using the motion vector computed by picture block motion detecting circuit 6, the motion compensation inter-frame differential coding unit 10 computes differential values between a predicted signal in the forward or backward frame memory 4 and a block signal which is shifted by the amount of motion vector, and thereby carries out DCT quantization. Therefore, the predictive coding is carried out after the picture block motion detection. Since the predictive coding is carried out at the rate of one frame per 33 ms, the processing time is also 24 μs per one MB. Therefore, gradient of inter-frame differential coding (predictive coding) is one MB per 24 μs in FIG. 5. Predictive coding may be processed at any time shortly after the motion detection at a fixed speed (a dotted line). In the motion detection at a variable speed (a solid line), however, a delay time should be set in advance so that predictive coding is processed after the motion detection even in the worst case.

Advantage of the first embodiment is in that 1024 points are sufficient for searching appropriate motion vector for MB having smaller activity, which does not deteriorate the picture quality in such conditions. Alternatively, for MB having larger activity which needs to search wider range, it is possible to assign longer time for computing 4096 points, which may improve picture quality.

Embodiment 2

Computing quantity can be decreased by sub-sampling picture block motion detecting coding picture 3 and computing the motion search. In FIG. 6A, since only 128 picture elements which is a half of 256 picture elements is searched, it is possible to search 2048 points of FIG. 2B, if picture block detection arithmetic unit which searches all picture elements is used. Where, in the second embodiment, it is assumed that the picture block motion detector for 1024 points search of FIG. 2A is used in case of no sub-sampling. Under this assumption, 2048 points search of FIG. 2B is possible in case of ½ sub-sampling, on the other hand 4096 points search of FIG. 2C is possible in case of ¼ sub-sampling.

The second embodiment is explained concretely below using FIG. 6. Search block (16×16 elements) of preceding or succeeding frames of FIG. 6A is vertically shifted by a shift register in a frame memory. Since the picture elements are shifted upward one point when evaluation for a point is completed, it is possible to evaluate the next point which is lower by one point. By repeating this procedure, one vertical line can be searched. After evaluation of one vertical line, picture element is shifted horizontally by one point to repeat the same steps. After 32 vertical evaluations and 32 horizontal evaluations are carried out, evaluation values of all 1024 points are obtained. A vector at a point of the smallest evaluation value within 1024 points corresponds to a motion vector.

Figure 8:
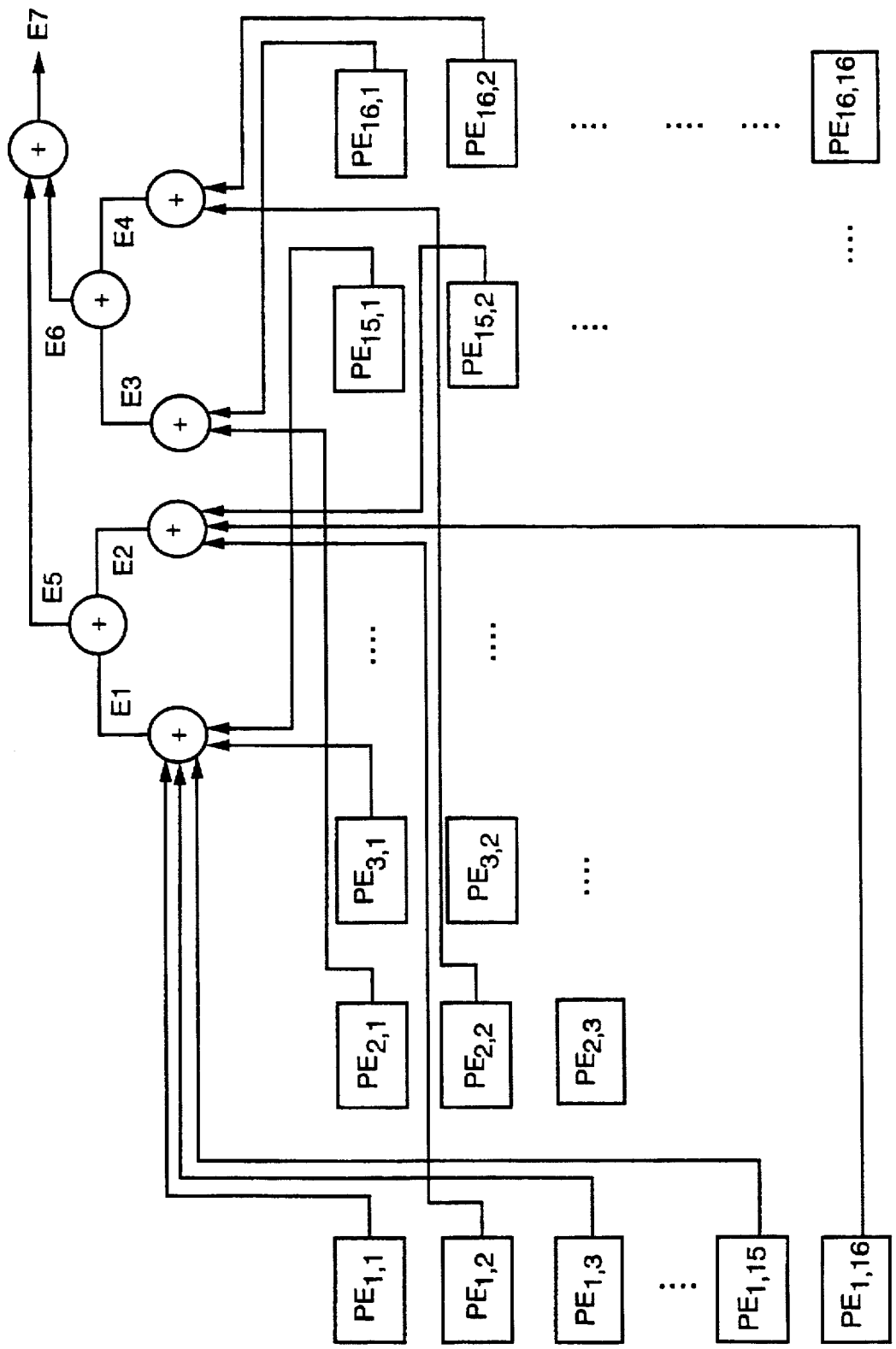
FIG. 8 shows a block diagram showing calculation process of the present invention.

An evaluation method of the present invention is explained below. The whole decoded block (256 picture elements) without being sub-sampled is stored in a register in advance, then respective picture elements of the blocks are compared with those of search blocks, and sum of differential absolute values between respective picture elements is obtained by 256 PEs (processor elements) of FIG. 6B. Calculation process is shown in FIG. 7 and in FIG. 8. In FIG. 7, respective picture elements $x_{i,j}$ of searched block are data which is shifted from forward or backward frame memory by shift register. Picture elements $y_{i,j}$ of coded block are transferred from coded picture frame memory in advance, which do not change until whole search of MB is completed. FIG. 8 shows the circuit design to obtain an evaluation function.

Figure 9:
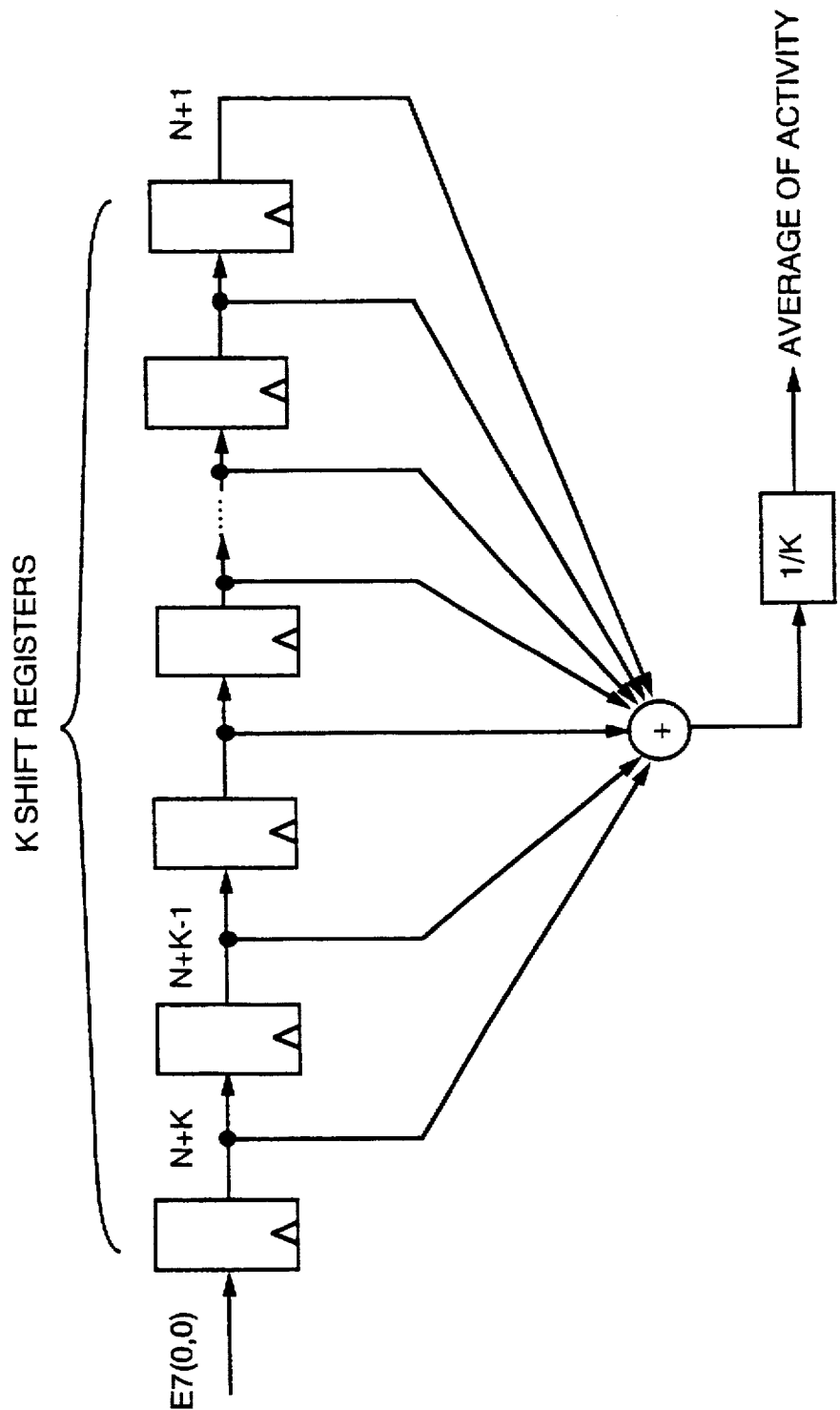
FIG. 9 shows a circuit to obtain average of activity of the present invention.

FIG. 9 shows a circuit of the present invention to obtain average of activity. An evaluation function of (N+1)-th motion is obtained before detecting the motion of (N+1)-th picture block, and then shifted it by shift register. An evaluation function of motion 0 of (N+1)-th−(N+K−1)-th motion is obtained before respective (N−K+2)-th−N-th picture block motion detection is started.

The evaluation function is a function of vector (h, v), where h, v corresponds to values within search range. Therefore, a vector $(h_0, v_0)$ corresponding to the minimum vector E (h, v) is a motion vector. Average of activity A is obtained as follows if using a point of a vector (0, 0) (no motion).

$$\text{average of activity } A = 1/K \sum_{i=N+1}^{N+K} Ei(0,0)$$

where, $E_i$ (0, 0) is an evaluation function of non-motion i MB-th point.

(1) In case of no sub-sampling, evaluation function $E_7$ is obtained as follows by inserting respective corresponding picture elements into picture elements $y_{i,j}$.

when $Z_{i,j}=|x_{i,j}-y_{i,j}|$:

Evaluation function $E_7=\Sigma Z_{i,j}$ (i=1~16,j=1~16) . . . 256 points.

(2) In case of ½ sub-sampling, evaluation functions $E_5$ and $E_6$ are obtained, by inserting picture elements $y_{i,j}$ and $y_{i-1,j}$ into predicted picture memory for every vertical i line having even number. Thereby, 2 points (toward horizontal direction) can be searched at one time, which can provide twice as large an area of search at a time. After a vertical line is searched, the searching position is shifted horizontally by two picture elements and the same procedure is repeated. Thereby, it is possible to search the area of 32 points (vertical)×64 points (horizontal) (=2048) at a time.

when $Z_{i,j}=|x_{i,j}-y_{i,j}|$(i:odd number, J=1~16):

Evaluation function $E_5=\Sigma Z_{i,j}$ . . . 128 points.

when $Z_{i,j}=|x_{i,j}-y_{i,j}|$(i:even number, J=1~16):

Evaluation function $E_6=\Sigma Z_{i,j}$ . . . 128 points.

(3) In case of ¼ sub-sampling, picture element value of $y_{2m+1, 2m+1}$ is inserted into the resisters $y_{2n+1, 2m+2}$, $y_{2n+2, 2m+1}$, $y_{2n+2, 2m+2}$ (m=0, 1, 2 . . . , n=0, 1, 2 . . . ), to obtain the evaluation functions $E_1$, $E_2$, $E_3$, $E_4$ as follows. Thereby, four points (2 points toward horizontal direction×2 points toward vertical direction) can be searched at one time, which can provide four times as large area of search at a time. After the search block register is searched once, the searching position is shifted vertically by two picture elements. After the a vertical line is searched, searching position is shifted horizontally by two picture elements and the same procedure is repeated. Thereby, it is possible to search an area of 64 points (vertical)×64 points (horizontal)(=4096) at a time;

when $Z_{i,j}=|x_{i,j}-y_{i,j}|$(i:odd number, J:even number):

Evaluation function $E_1=\Sigma Z_{i,j}$ . . . 64 points.

when $Z_{i,j}=|x_{i,j}-y_{i,j}|$(i:odd number, J:even number):

Evaluation function $E_2=\Sigma Z_{i,j}$ . . . 64 points.

when $Z_{i,j}=|x_{i,j}-y_{i,j}|$(i:even number, J:odd number):

Evaluation function $E_3=\Sigma Z_{i,j}$ . . . 64 points.

when $Z_{i,j}=|x_{i,j}-y_{i,j}|$(i:even number, J:even number):

Evaluation function $E_4=\Sigma Z_{i,j}$ . . . 64 points.

In the same way, in FIG. 6B, since motion search is carried out using 64 picture elements which are one quarter of 256 picture elements, it is possible to search 4096 points as shown in FIG. 2C. As explained above, an advantage of increased points for search is expected.

Embodiment 3

When distribution S of respective picture elements in blocks of picture block motion detecting coded picture 3 is small, respective picture elements hardly change. Therefore, differential value in the detected motion vector is small even at considerable rough sub-sampling, which avoids decrease of coding efficiency at succeeding inter-frame differential coding. On the contrary, in case that distribution σ of respective picture elements in blocks of picture block motion detecting coded picture 3 is large, respective picture elements change largely. Therefore, inappropriate motion vectors are detected by sub-sampling, which makes inter-frame differential value large, and provides decreased compression efficiency.

In the present embodiment, thresholds T1, T2 and T3 (0<T1<T2<T3) are set as activity. In case that distribution σ of respective picture elements in blocks of picture block motion detecting coded picture 3 is less than threshold T1, ¼ sub-sampling is carried out. In case that distribution σ is between thresholds T1 and T2, ½ sub-sampling is carried out. In case that distribution σ is between thresholds T2 and T3, sub-sampling is not carried out. In case that distribution σ is larger than threshold T3, motion search is carried out by half-picture-element accuracy.

Figures 10A, 10B:
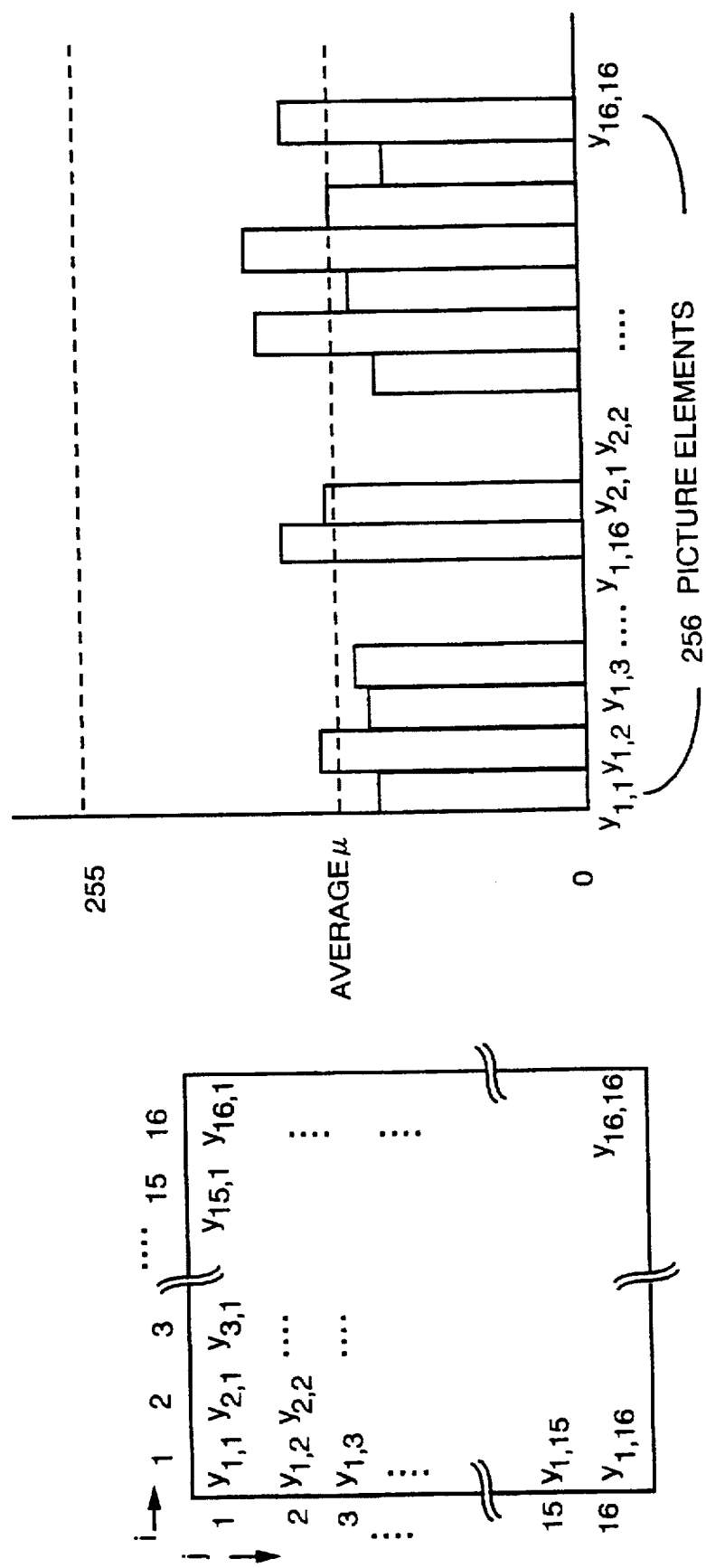
FIG. 10 shows a method for calculating average μ of the picture elements of the present invention.

A concrete example of the third embodiment is explained below. FIG. 10 shows a method for calculating average μ and distribution σ of an embodiment of the present invention. As shown in FIG. 10, if assuming respective values of coded picture elements are $y_{i,j}$(i=1~16, j=1~16), average μ and distribution σ are obtained by the following formulae.

$$\text{distribution } \sigma = \sqrt{\Sigma (y_{i,j}-\mu)^2}$$

where, average $\mu=\frac{1}{256}\Sigma y_{i,j}$ where, $y_{i,j}$(digital, 8 bit) are values between 0 and 255. Distribution σ is value indicating extent of change of respective picture elements (all are the same values when σ=0). If σ is small, it provides an advantage of enlarged search range by high accuracy of picture elements obtained by sub-sampling. If σ is large, on the contrary, accuracy of search range decreases by low accuracy of picture elements obtained by sub-sampling. One example of a sets of thresholds can be set such as T3=5, T4=10 and T5=15. Search range is the same as that of in the second embodiment. That is, in case of no sub-sampling, search range is 32(horizontal) ×32(vertical)(=1024 points), in case of ½ sub-sampling, 64(horizontal)×32(vertical)(=2048 points) and, in case of ¼ sub-sampling, 64(horizontal)×64(vertical)(=4096 points).

Embodiment 4

Figure 11:
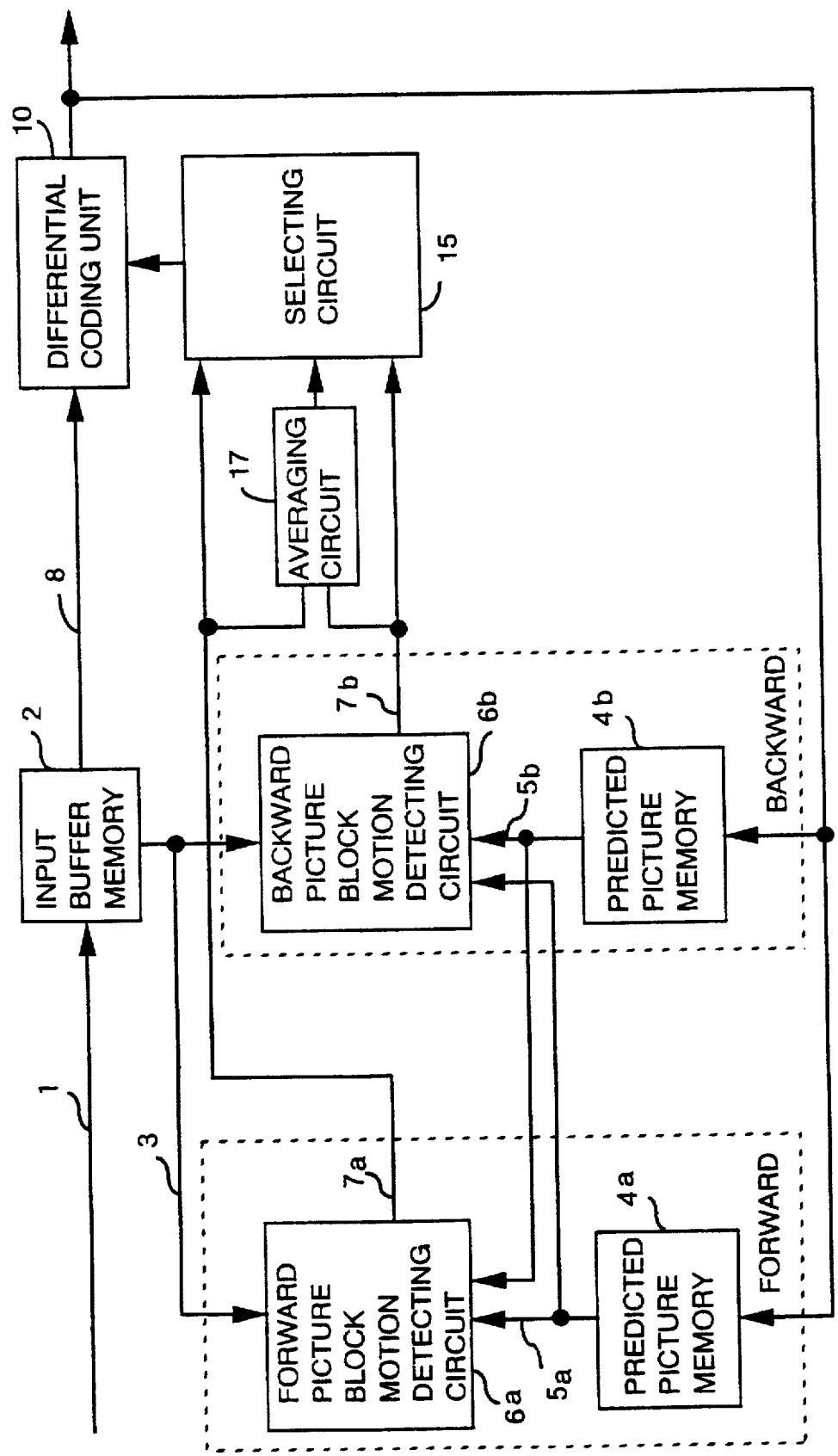
FIG. 11 shows a forward and backward bidirectional picture block motion detection apparatuses of the present invention.
Figure 12B:
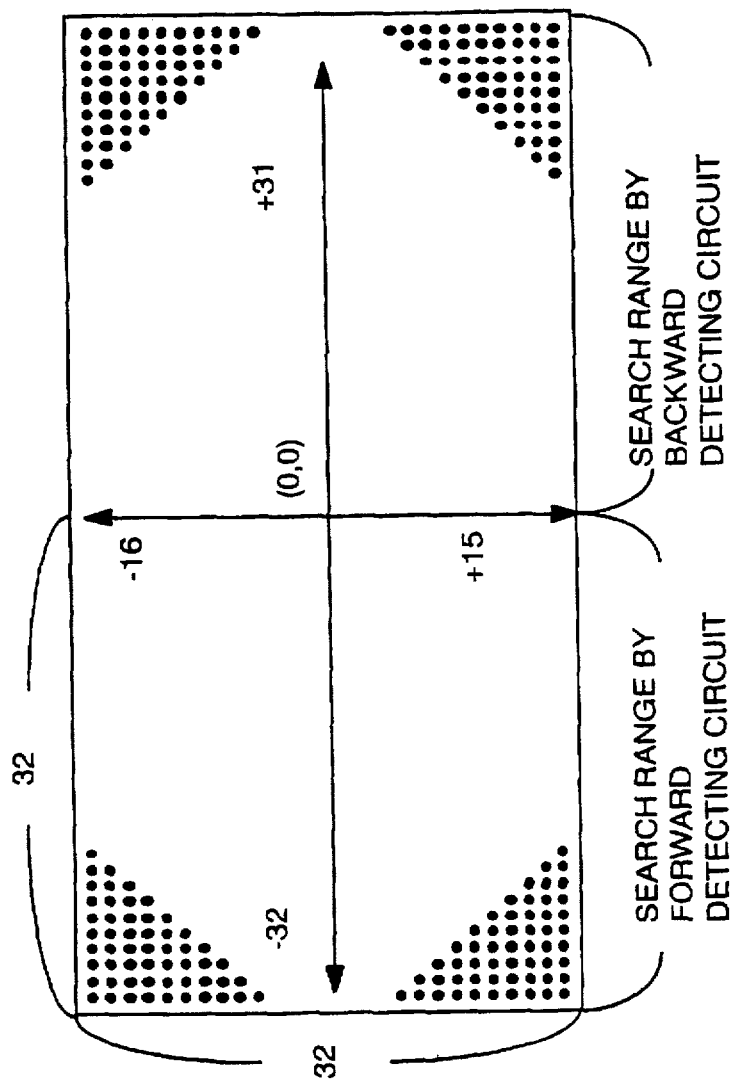
FIG. 12 shows a search range for only a forward picture block motion detecting circuit and another search range for both forward and backward picture block motion detecting circuits.
Figure 12A:
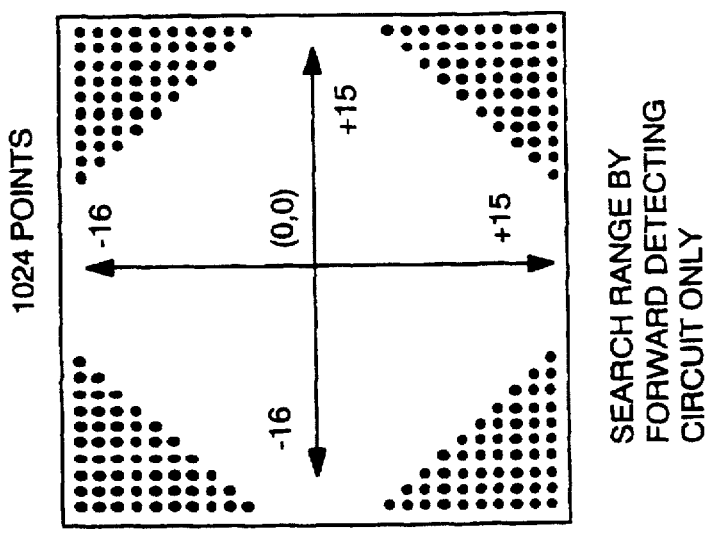

FIG. 11 shows a picture block motion detection apparatuses for forward and backward bidirectional inter-frame differential coding of an embodiment of the present invention. Predicted picture 5a from forward predicted picture memory 4a is transferred to backward picture block motion detecting circuit 6b. Backward picture block motion detecting circuit 6b carries out backward inter-frame coding while forward inter-frame coding is in progress. However, during the time of motion detection of P picture, backward picture block motion detecting circuit 6a is in idle state. In other words, as shown in FIG. 12A, the search range searched only by forward picture block motion detecting circuit 6a is 1024 points from (−16, −16) to (+15, +15) with its center (0, 0).

On the other hand, in case of P picture, forward picture block motion detecting circuit 6a searches 1024 points from (−32, −16) to (−1, +15), and backward picture block motion detecting circuit 6b searches 1024 points from (0, −16) to (+31, +15). As a result, 2048 points from (−32, −16) to (+31, +15) are searched in total as shown in FIG. 12B.

The construction of FIG. 12 is the same as those of FIGS. 7, 8, but different in that picture elements $x_{i-16,j}$ in the blocks searched by forward picture block motion detecting circuit 6a are inserted instead of picture elements $x_{i,j}$, and picture elements $x_{i+16,j}$ in the blocks searched by backward picture block motion detecting circuit 6b are inserted instead of picture elements $x_{i,j}$.

Search ranges are allocated as follows, for example, the left part of FIG. 12B (minus part of horizontal vector) is allocated to the forward picture block motion detecting circuit 6a, and the right part of FIG. 12B (0 and plus part of horizontal vector) is allocated to the backward picture block motion detecting circuit 6b.

Figure 14:
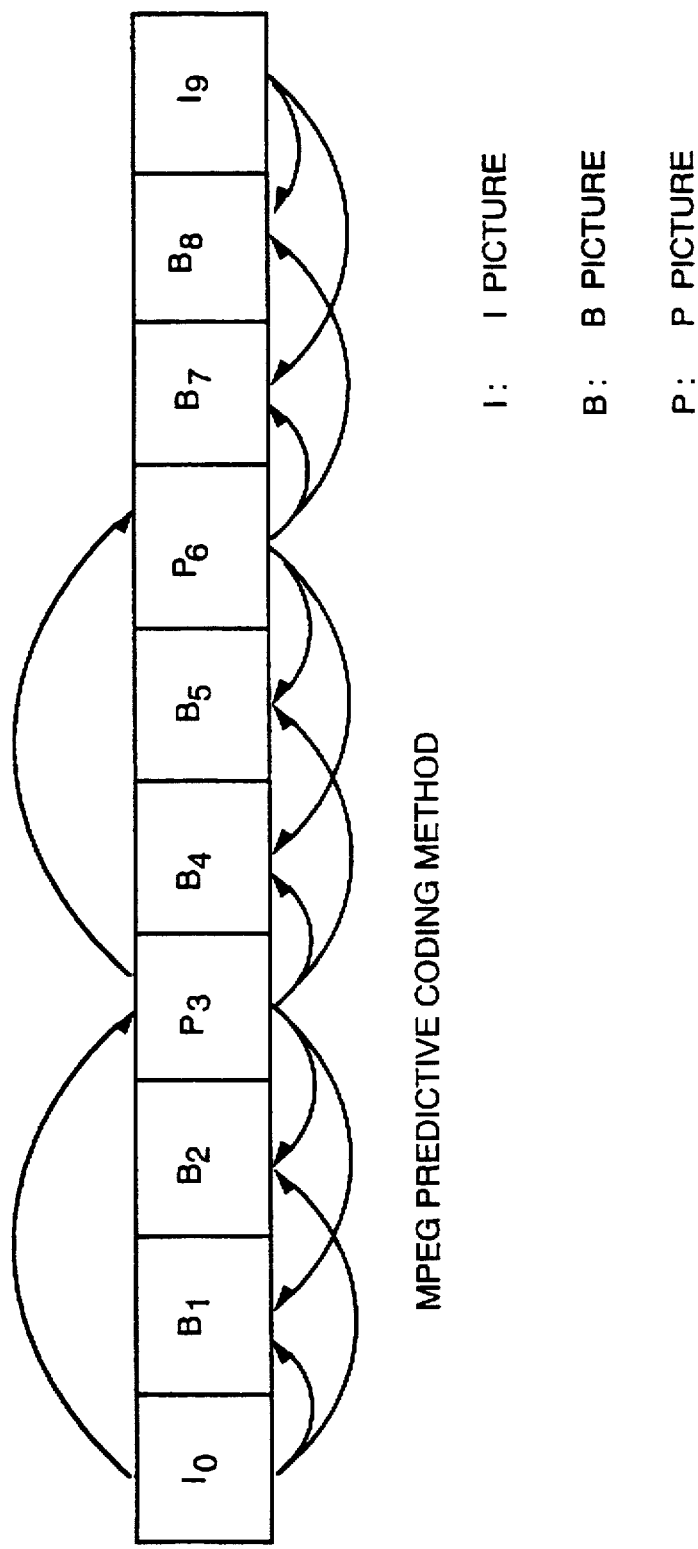
FIG. 14 shows a general predictive coding method for MPEG.
Figure 15:
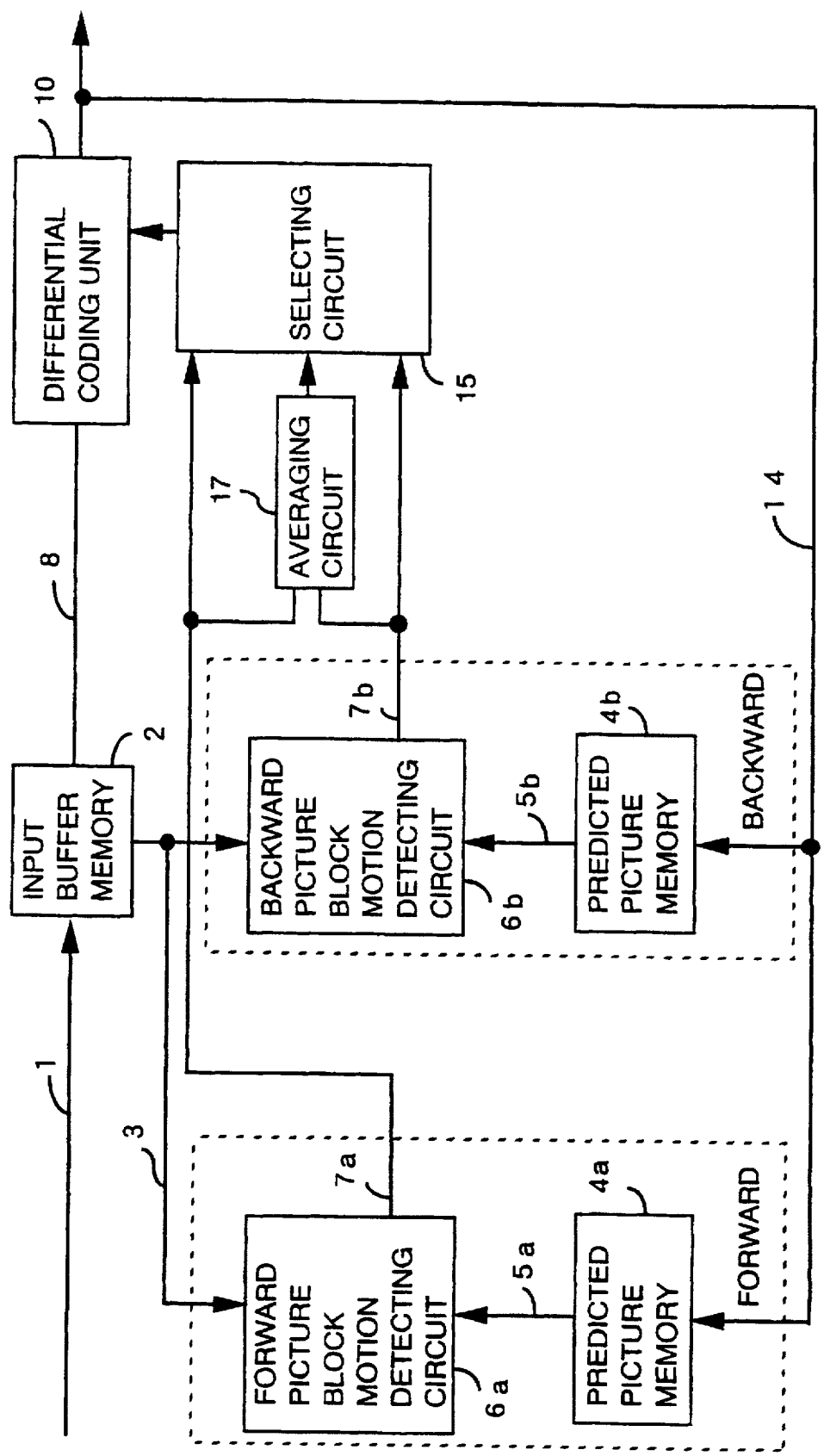
FIG. 15 shows a conventional forward and backward bidirectional picture block motion detecting apparatus.

In the above construction, it is necessary to switch alternately the forward and backward predicted picture memories 4a and 4b and also to switch alternately the picture block motion detecting circuits 6a and 6b. In FIG. 11, there are a forward I/P predicted picture memory and a backward I/P predicted picture memory. However, as shown in respective frames in FIG. 14, for example, actually $I_0$ picture is stored in forward frame memory, picture $P_3$ is stored in backward frame memory, and picture $P_6$ is overwritten onto preceding $I_0$ picture after picture $B_1$ and picture $B_2$ are coded. At the time of coding pictures $B_4$ and picture $B_5$, picture $P_6$ are inserted into forward frame memory, and picture $P_3$ is inserted into backward frame memory. Therefore, it is necessary to switch forward picture block motion detecting circuit and backward picture block motion detecting circuit.

FIG. 11 also shows a path to transfer the predicted picture 5b from backward predicted picture memory 4b to forward picture block motion detecting circuit 6a. This path is necessary for using forward picture block motion detecting circuit 6a for searching backward picture block motion. In this case, preceding picture elements $x_{i,j}$ is inserted into preceding picture block motion detecting circuit 6a.

In the present invention, it is possible to search 2048 points during forward inter-frame coding as shown in FIG. 2B, using picture block motion detecting circuit which is able to search 1024 points as shown in FIG. 2A. As described above, in the present invention, it is possible to detect more appropriate motion vector and to increase coding efficiency (compression rate), by enlarging the search range.

What is claimed is:

1. A picture block motion detecting apparatus for detecting a motion vector from a preceding or succeeding picture frame by dividing a picture into blocks comprising:

a first memory for storing an input picture being divided into a plurality of blocks;

a second memory for storing a predicted picture divided into a plurality of blocks;

an activity calculating circuit coupled to the first and second memories for calculating, prior to searching for a block in the second memory most similar to a block in the first memory to determine a motion vector, an activity for a first block of the input picture, comparing the activity to first and second thresholds to determine a search range for the search, and outputting control signals indicative of the search range, wherein the activity calculating circuit outputs:

a first control signal indicative of a first search range when the activity is less than the first threshold;

a second control signal indicative of a second search range, larger than the first search range, when the activity is between the first and second thresholds; and a third control signal indicative of a third search range, larger than the second range, when the activity is larger than the second threshold; and a picture block motion detecting circuit coupled to the activity calculating circuit and the first and second memories for searching in a range determined by the control signals, and outputting a motion vector responsive to the searching.

2. The picture block motion detecting apparatus of claim 1 wherein the activity is calculated according to a distribution of respective picture elements of the first block of the input picture.

3. The picture block motion detecting apparatus of claim 1 wherein the activity is a sum of absolute values of differences between values of picture elements in the first block of the first input picture and a first block of the predicted picture when motion vectors of the picture elements are 0.

4. The picture block motion detecting apparatus of claim 1 wherein the picture block motion detecting circuit comprises:

(a) means for searching the third range by sub-sampling the first block of the input picture using a ¼ sub-sampling rate;

(b) means for searching the second range by sub-sampling the first block of the input picture using a ½ sub-sampling rate; and (c) means for searching the first range without sub-sampling the first block of the input picture.

5. The picture block motion detecting apparatus of claim 1 further comprising means for sub-sampling the input picture using a plurality of sub-sampling rates when the search range is larger than a threshold.

6. The picture motion detecting apparatus of claim 5 wherein the activity is a distribution σ, the distribution σ being defined by:

$$\sigma = \sqrt{\Sigma (y_{i,j} - \mu)^2} ,$$

where $y_{i,j}$ is a value for a picture element of the first block of the input picture and µ is a normalized sum of picture element values for the first block of the input picture, and the picture block motion detection apparatus comprises:

means for setting third, fourth, and fifth thresholds for determining a sampling rate, wherein the fourth threshold is larger than the third threshold and the fifth threshold is larger than the fourth threshold;

means for selecting and sub-sampling for the first block of the input picture at:

(a) ¼ sub-sampling, when the distribution σ is less than the third threshold, (b) ½ sub-sampling when the distribution σ is between the third and fourth thresholds, (c) no sub-sampling when the distribution σ is between the fourth and fifth thresholds, and (d) half-picture-element accuracy when the distribution σ is larger than the fifth threshold.

7. The picture block motion detecting apparatus of claim 5 wherein, when the means for sub-sampling the input picture performs no sub-sampling, the activity calculating circuit calculates evaluation function $E_7$ from the following formula:

$$E_7 = \Sigma Z_{i,j}.$$

where, $Z_{i,j} = |x_{i,j} - y_{i,j}|$, and $x_{i,j}$ are picture element values of blocks of the predicted picture, $y_{i,j}$ are picture element values of blocks of the input picture, and i and j are integers in a range of 1 to 16.

8. The picture motion detecting apparatus of claim 5 wherein the means for sub-sampling the input picture performs ½ sub-sampling and wherein the activity calculating circuit calculates evaluation functions $E_5$ and $E_6$ from the following formulae:

$$E_5 = \Sigma Z_{i,j},$$

where $Z_{i,j} = |x_{i,j} - y_{i,j}|$, $x_{i,j}$ denotes a value of a picture element of the predicted picture, $y_{i,j}$ denotes a value of a picture element of the input picture, i is an odd number, and j is an integer in a range of 1 to 16, $$E_6 = \Sigma Z_{i,j},$$

where $Z_{i,j} = |x_{i,j} - y_{i,j}|$, i is an even number, and j is an integer in a range of 1 to 16.

9. The picture block motion detecting apparatus of claim 5 wherein the means for sub-sampling the input picture performs ¼ sub-sampling and wherein the activity calculating circuit calculates evaluation functions $E_1$, $E_2$, $E_3$, and $E_4$ from the following formulae:

evaluation function $E_1 = \Sigma Z_{i,j}$,
wherein $Z_{i,j} = |x_{i,j} - y_{i,j}|$, where $x_{i,j}$ denotes a value of a picture element of the predicted picture and $y_{i,j}$ denotes a value of a picture element of the input picture, i is an odd number, and j is an even number, evaluation function $E_2 = \Sigma Z_{i,j}$,
wherein $Z_{i,j} = |x_{i,j} - y_{i,j}|$, i is an odd number, and j is an even number, evaluation function $E_3 = \Sigma Z_{i,j}$,
wherein $Z_{i,j} = |x_{i,j} - y_{i,j}|$, i is an even number and j is an odd number, and evaluation function $E_4 = \Sigma Z_{i,j}$,
wherein $Z_{i,j} = |x_{i,j} - y_{i,j}|$, i is an even number and j is an even number.

10. A picture block motion detecting apparatus comprising:

an input buffer memory for storing an input picture divided into a plurality of blocks;

a predicted memory for storing a predicted picture divided into a plurality of blocks; and a picture block motion detecting circuit including:
means for calculating, before searching the predicted picture to determine a motion vector, an activity, the activity being a sum of absolute values of differences between values of picture elements of a first block of the input picture from the input buffer memory and picture elements of a first block of the predicted picture from the predicted picture memory, wherein a motion vector for the first block of the input picture and the first block of the predicted picture is 0; and means for searching a range of blocks responsive to the activity to determine a motion vector.

\* \* \* \* \*